(12) United States Patent
Winick et al.

(10) Patent No.: US 7,177,639 B2
(45) Date of Patent: Feb. 13, 2007

(54) DUAL SITE SUPERVISION FOR A CONTROL CHANNEL CELLULAR RADIO USED IN A FIRE ALARM REPORTING SYSTEM

(75) Inventors: Steven J. Winick, Woodmere, NY (US); William R. Blum, Huntington Station, NY (US)

(73) Assignee: Honeywell International, Inc., Morristown, NJ (US)

( * ) Notice: Subject to any disclaimer, the term of this patent is extended or adjusted under 35 U.S.C. 154(b) by 217 days.

(21) Appl. No.: 10/608,912

(22) Filed: Jun. 27, 2003

(65) Prior Publication Data

US 2004/0266431 A1 Dec. 30, 2004

(51) Int. Cl.
H04Q 7/20 (2006.01)

(52) U.S. Cl. ................ 455/434; 455/404.1; 455/404.2; 455/450; 455/451; 455/452.1; 455/452.2; 455/455; 455/509; 455/512; 455/516; 455/521; 455/523

(58) Field of Classification Search ............. 455/404.1, 455/404.2, 434, 521, 450, 451, 452.1, 452.2, 455/455, 509, 512, 523, 516
See application file for complete search history.

(56) References Cited

U.S. PATENT DOCUMENTS 5,343,493 A * 8/1994 Karimullah ................. 375/130
5,884,184 A * 3/1999 Sheffer ........................ 455/521
6,636,732 B1 * 10/2003 Boling et al. ............ 455/404.1

* cited by examiner

Primary Examiner—Quynh H. Nguyen
(74) Attorney, Agent, or Firm—Scully, Scott, Murphy & Presser, P.C.

(57) ABSTRACT

Dual site supervision is provided for a control channel cellular radio for a fire alarm reporting system that uses logic that causes a control channel cellular transceiver to operate in a nonstandard manner and to use a different and second cellular base station or site that the unit would not normally select operating pursuant to a standard cell phone software module. The logic causes the control channel cellular transceiver to monitor and test through more than one cell base station or site, thereby meeting the dual communication path supervision requirement for UL listed communications systems for stand alone fire alarm reporting systems. The available cellular control channels are first scanned, and the signal strength of each cellular control channel is measured. Then the cellular control channel with the strongest signal strength and the cellular control channel with the second strongest signal strength which are verified as being available for the assigned carrier are selected to report the status of the fire alarm system. A cellular radio message on the status of the fire alarm system is transmitted over the cellular control channel with the strongest signal strength, or if unavailable over the cellular control channel with the second strongest signal strength.

12 Claims, 4 Drawing Sheets

DUAL SITE SUPERVISION FOR A CONTROL CHANNEL CELLULAR RADIO USED IN A FIRE ALARM REPORTING SYSTEM

BACKGROUND OF THE INVENTION

The present invention relates generally to dual site supervision for a control channel cellular radio used in a fire alarm reporting system, and more particularly pertains to a method and system of dual site supervision for a control channel cellular radio used in a fire alarm reporting system wherein the standard cell phone software module is modified to operate the cell phone in a nonstandard manner to communicate through two separate cellular base stations.

In UL listed communications systems for reporting fire alarms, two separate communications paths are required. The UL requirement for two separate and independent communication paths for a fire alarm system, when implemented in a telephone line reporting system, requires two separate and independent telephone connections and lines. In such a telephone line reporting system, a test call would be placed periodically (e.g. once daily) and alternately over each of the two telephone connections and lines to ensure that the two telephone connections are operating properly in the event that a real fire had to be reported.

For a cellular telephone reporting system for a fire alarm system, two separate RF signals through two separate cellular base stations would be required, and a test call would be placed periodically (e.g. once daily) and alternately through each of the two separate cellular base stations. However, in conventional control channel cellular radio transmitters, the transmitter itself locates radio channel availability and cell site availability, and the radio is programmed to monitor and use only the single channel and cell site that the radio's logic and programming selects. This limitation makes this class of product ineligible for stand alone fire alarm reporting systems complying with UL requirements.

Accordingly, a problem exists with respect to using a cellular telephone reporting system for a fire alarm system because a cellular telephone is programmed to communicate through only one cell base station and not to communicate through two separate cell base stations. Accordingly, to use a cellular telephone reporting system for a fire alarm system requires that the standard cell phone software module be modified to operate the cell phone in a nonstandard manner to communicate through two separate and independent cellular base stations.

In a typical prior art cell phone, the available cellular control channels are first scanned, and the signal strength of each cellular control channel is measured, and a channel list is developed which sorts and classifies the available cellular control channels according to signal strength, which information is taken advantage of by the present invention.

SUMMARY OF THE INVENTION

The present invention provides dual site supervision for a control channel cellular radio for a fire alarm reporting system that uses logic that causes the normal control channel cellular transceiver to operate in a nonstandard manner and to use a different and second cellular base station or site that the unit would normally not select operating pursuant to a standard cell phone software module. The logic causes the control channel cellular transceiver to monitor and test through more than one cell base station or site, thereby meeting the dual communication path supervision requirement for UL listed communications systems for stand alone fire alarm reporting systems.

The present invention provides a method and system for operating a control channel cellular radio transmitter for reporting a status of a fire alarm system. The available cellular control channels are first scanned, and the signal strength of each cellular control channel is measured. The cellular control channel with the strongest signal strength which is verified as being available for the assigned carrier is selected to report the status of the fire alarm system, and also the cellular control channel with the second strongest signal strength which is also verified as being available for the assigned carrier is selected to report the status of the fire alarm system. A cellular radio message on the status of the fire alarm system is transmitted over the cellular control channel with the strongest signal strength, or if unavailable for some reason, over the cellular control channel with the second strongest signal strength.

In greater detail, a channel list is developed in which the cellular control channels are sorted and classified according to signal strength, and the channel list is checked for availability of two or more channels with acceptable RSSI (Receive Signal Strength Indication). If two or more channels with acceptable RSSI are not available, then a loss of two site coverage is reported. If two or more channels with acceptable RSSI are available, then the reporting system operates on the strongest verified channel until a supervision delay or a loss of signal is experienced.

After selecting a cellular control channel with the strongest signal strength and verifying it as being available for the assigned carrier, the reporting system selects the next strongest signal channel on the channel list and verifies it as being available for the assigned carrier. If not verified, then the reporting system repeats the selecting and verifying steps until the last available channel on the channel list has been selected. If after selecting all available channels on the channel list, a second channel verified as being available for the assigned channel is not found, then the reporting system reports a loss of two site coverage of two separate verified channels with acceptable RSSI, and operates on the strongest verified channel. If a second verified channel for the assigned carrier is found, then the reporting system operates on the first strongest verified channel and reports the two site coverage as operating, until a supervision delay or a loss of signal is experienced.

BRIEF DESCRIPTION OF THE DRAWINGS

The foregoing objects and advantages of the present invention for dual site supervision for a control channel cellular radio used in a fire alarm reporting system may be more readily understood by one skilled in the art with reference being had to the following detailed description of several embodiments thereof, taken in conjunction with the accompanying drawings wherein like elements are designated by identical reference numerals throughout several views, and in which.

DETAILED DESCRIPTION OF THE INVENTION

Figure 1:
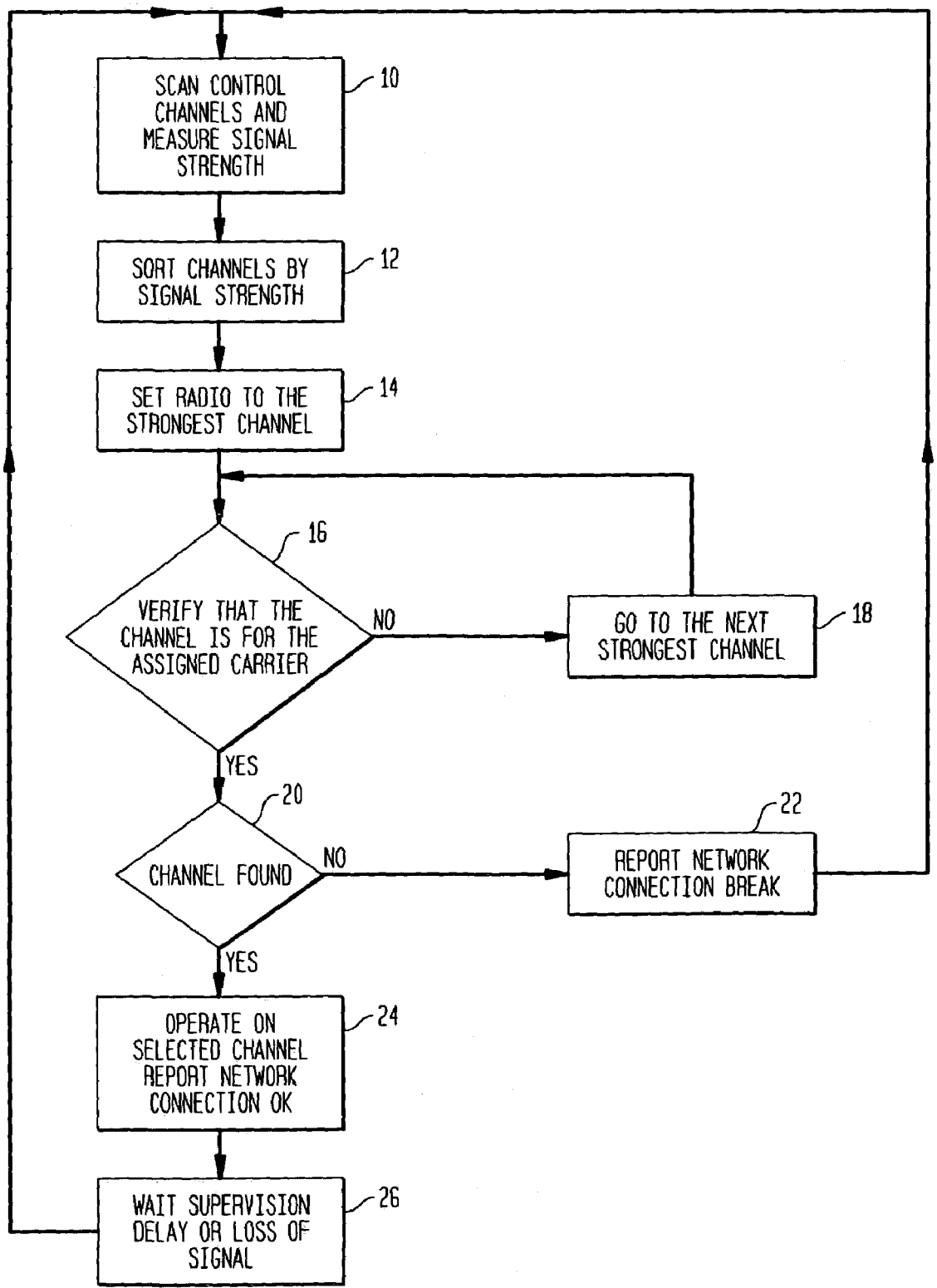
FIG. 1 illustrates a logic flow chart/diagram of a standard prior art cellular phone channel supervision control loop.

FIG. 1 illustrates a logic flow chart/diagram of a standard prior art cellular phone channel supervision control loop. The process of the control loop in the cellular phone is started at 10 by scanning through the available cellular control channels and measuring the signal strength in each cellular control channel. At 12, the cellular control channels are sorted and classified according to signal strength, and at 14 the strongest signal channel is selected and the radio is set to the selected strongest signal channel. At 16, the selected channel is verified as being available for the assigned carrier (the channel system ID matches a system ID which is available for use). If not, at 18 the control loop proceeds to the next strongest signal channel as the selected channel and repeats step 16. If after cycling through all available channels, no verified assigned carrier channel is found, then the control loop proceeds through 20-No to 22 to report a break in the network connection. If a selected channel is verified as being for the assigned carrier at 16, then the control loop proceeds through 20-Yes to 24 to operate on the selected channel and report the network connection as operating and OK, until at 26 a supervision delay or a loss of signal is experienced. Then the control loop returns to 10 restart the process of the control loop.

Figure 2:
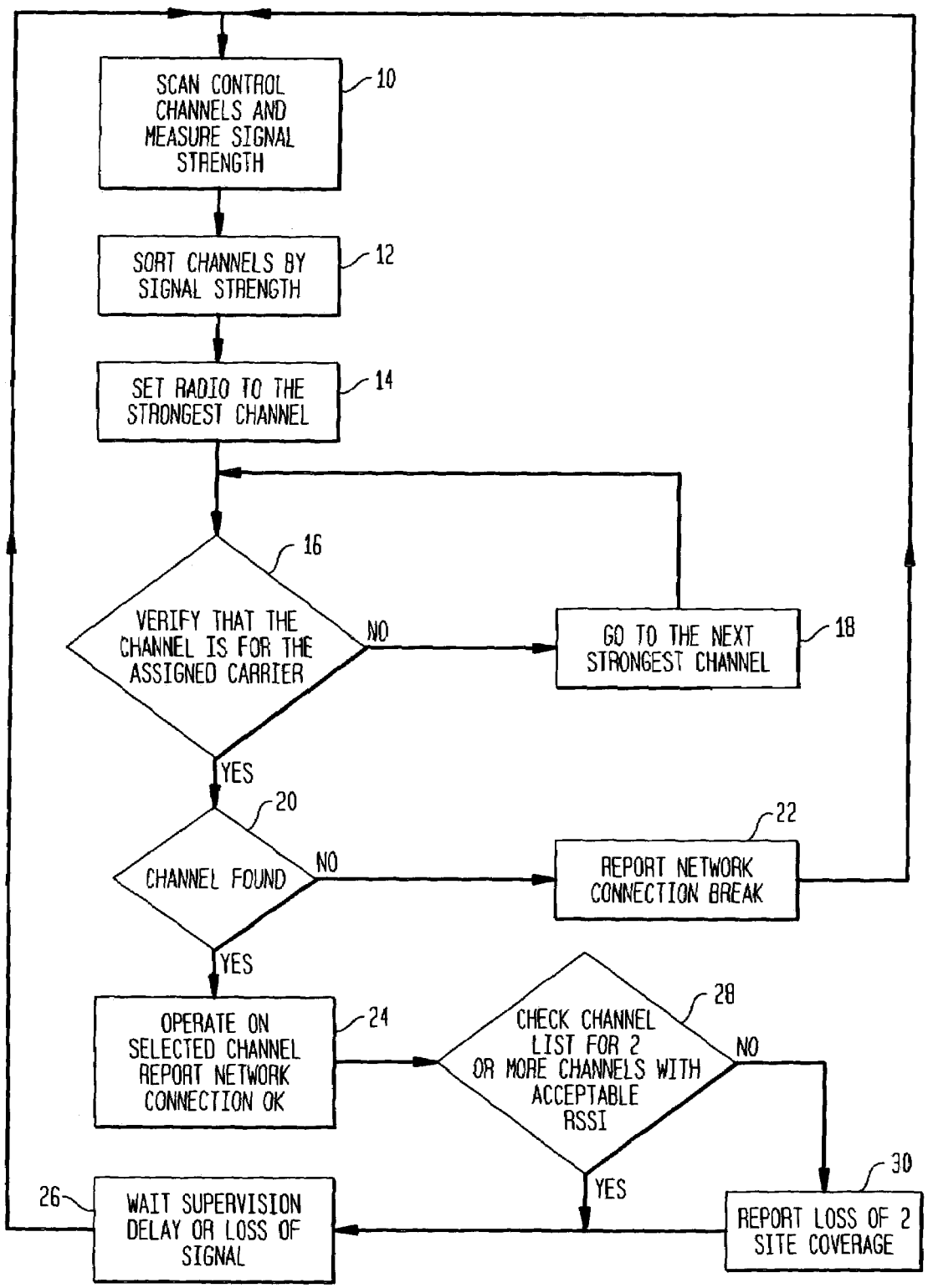
FIG. 2 is a logic flow chart/diagram of a modified cellular phone channel supervision control loop for fire alarm reporting applications for a first option of scan only, which is similar to the control loop of FIG. 1 and adds thereto a decision and step concerning an available second channel with acceptable RSSI for fire alarm reporting.

FIG. 2 is a logic flow chart/diagram of a modified cellular phone channel supervision control loop for fire alarm reporting applications for a first option of scan only which is similar to the control loop of FIG. 1, and adds thereto a decision 28 and step 30 concerning an available second (or more) channel with acceptable RSSI (Receive Signal Strength Indication) for fire alarm reporting. Following operation on the selected channel at 24, at 28 the channel list is checked for the availability of two or more channels with acceptable RSSI (Receive Signal Strength Indication). If two or more channels with acceptable RSSI are not available, then the control loop reports a loss of two site coverage at 30. If at 28, two or more channels with an acceptable RSSI are available, then as in FIG. 1, operation proceeds until at 26 a supervision delay or a loss of signal is experienced.

Figure 3:
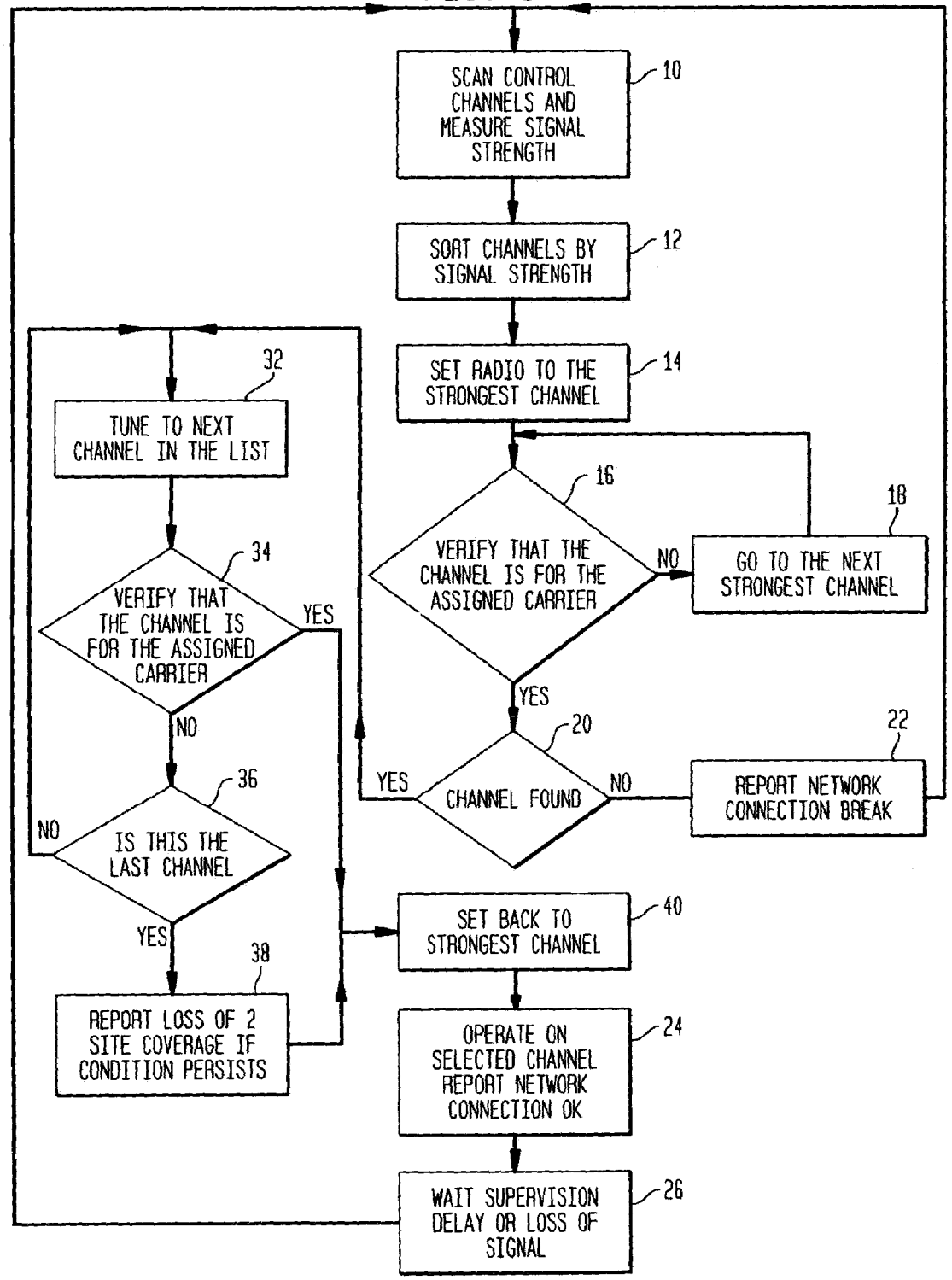
FIG. 3 is a logic flow chart/diagram of a modified cellular phone channel supervision control loop for fire alarm reporting applications for a second option of scan with verification, which is similar to the control loop of FIG. 1 and adds thereto several decisions and steps concerning an available and verified assigned carrier second channel with acceptable RSSI for fire alarm reporting.

FIG. 3 is a logic flow chart/diagram of a modified cellular phone channel supervision control loop for fire alarm reporting applications for a second option of scan with verification. The control loop is similar to the control loop of FIG. 1, and adds thereto several decisions and steps concerning an available and verified assigned carrier second channel with acceptable RSSI for fire alarm reporting. The control loop is similar to the control loop of FIG. 1, and after a first channel is verified at 16 and found at 20-Yes, several decisions and steps are added to determine the availability of a verified assigned carrier second channel with acceptable RSSI for fire alarm reporting.

After a first channel is verified at 16 and found at 20-Yes, at 32 the next strongest signal channel on the channel list is selected and tuned. At 34, the selected channel is verified as being available for the assigned carrier. If not, at 36 the control loop checks for the availability of another channel on the channel list, and if another channel is available on the channel list, the control loop proceeds to 32 to tune to the next strongest signal channel as the selected channel, and repeats steps 34 and 36 until the last available channel on the channel list has been selected and tuned. If after cycling through all available channels on the channel list, no channel is found and verified as being for the assigned channel, then the control loop proceeds through 36-Yes to 38 to report a loss of two site coverage of two separate verified channels with acceptable RSSI, and then proceeds to step 40 to return and tune to the first strongest and verified channel determined at 16, 20.

If at decision 34 a second verified channel for the assigned carrier is found, then the control loop proceeds through 34-Yes to step 40 to tune to the first strongest and verified channel determined at 16, 20. The control loop then proceeds to step 24 to operate on the selected channel and report the network connection as operating and OK, until at 26 a supervision delay or a loss of signal is experienced.

Figure 4:
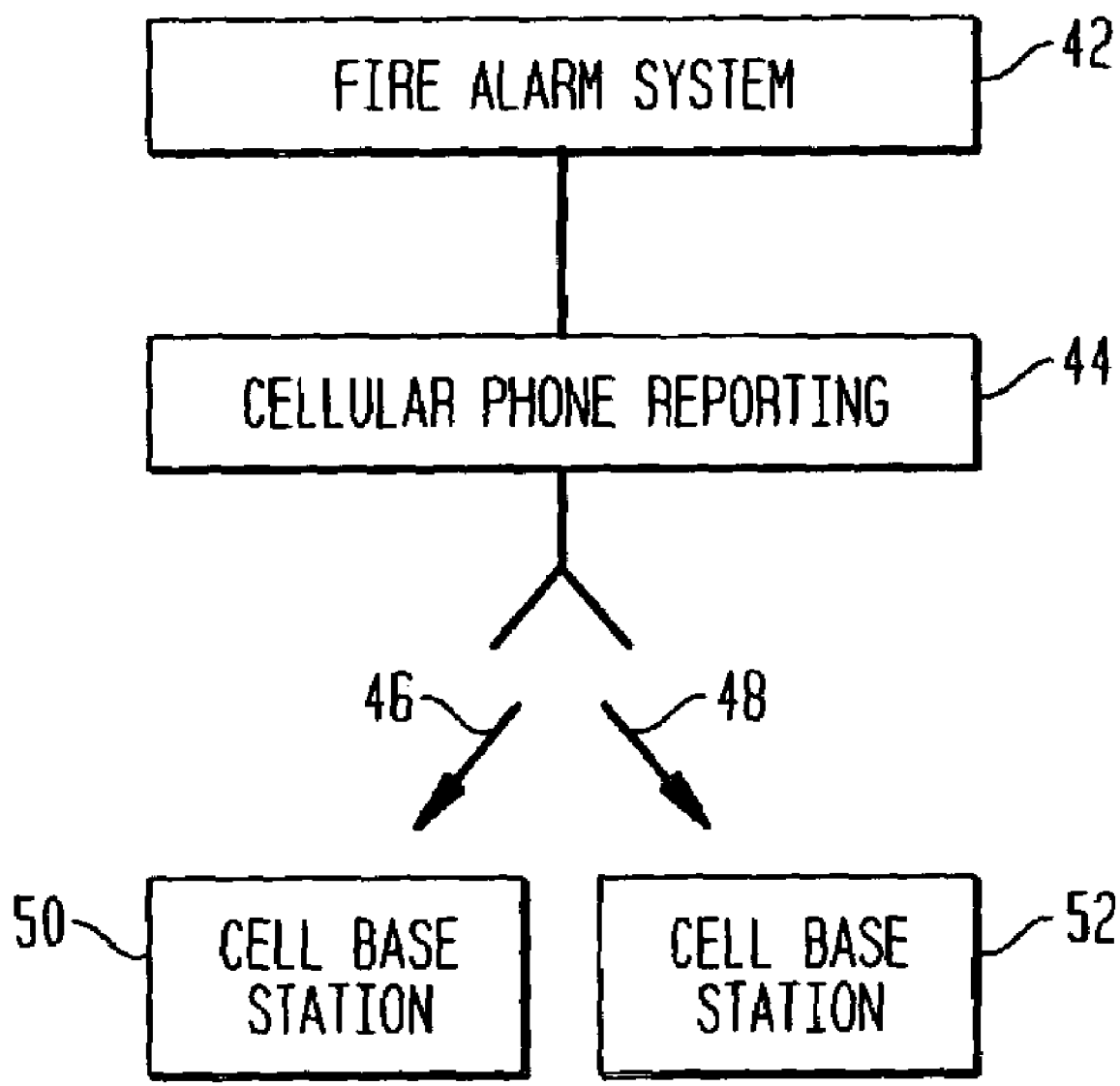
FIG. 4 illustrates dual site supervision for a control channel cellular radio used in a fire alarm reporting system wherein a fire alarm system reports its status through a cellular telephone connection which operates pursuant to either of the operational flow charts of FIGS. 2 and 3.

FIG. 4 illustrates dual site supervision for a control channel cellular radio used in a fire alarm reporting system wherein a fire alarm system 42 reports its status through a cellular telephone reporting system 44 which operates pursuant to one of the operational flow charts of FIGS. 2 and 3. The cell phone transmitter can communicate by either one of two separate cellular transmissions 46, 48 to two separate cellular base stations 50, 52, such that two separate and independent communications paths are available through either of the two separate cellular base stations 50, 52.

While several embodiments and variations of the present invention for dual site supervision for a control channel cellular radio used in a fire alarm reporting system are described in detail herein, it should be apparent that the disclosure and teachings of the present invention will suggest many alternative designs to those skilled in the art.

What is claimed is:

1. A method of operating a control channel cellular radio transmitter for reporting a status of a fire alarm system comprising:
    scanning available cellular control channels and measuring the signal strength of each cellular control channel;
    selecting a cellular control channel with the strongest signal strength which is verified as being available for the assigned carrier to report a status of the fire alarm system;
    selecting a cellular control channel with a second strongest signal strength which is also verified as being available for the assigned carrier to report a status of the fire alarm system;
    transmitting a cellular radio message on the status of the fire alarm system over either of the cellular control channel with the strongest signal strength or the cellular control channel with the second strongest signal strength.

2. The method of claim 1, wherein following the steps of scanning and measuring, developing a channel list in which the cellular control channels are sorted and classified according to signal strength.

3. The method of claim 2, wherein the channel list is checked for availability of two or more channels with acceptable RSSI (Receive Signal Strength Indication), and if two or more channels with acceptable RSSI are not available, then report a loss of two site coverage, and if two or more channels with acceptable RSSI are available, operate on the strongest verified channel until a supervision delay or a loss of signal is experienced.

4. The method of claim 2, wherein after the step of selecting a cellular control channel with the strongest signal strength, the next strongest signal channel on the channel list is selected and verified as being available for the assigned carrier, and if not verified, the next strongest signal channel is selected and verified, and if not verified, repeat the selecting and verifying steps until the last available channel on the channel list has been selected.

5. The method of claim 4, wherein after selecting all available channels on the channel list, a second verified channel for the assigned channel is not found, then report a loss of two site coverage of two separate verified channels with acceptable RSSI, and operate on the strongest verified channel.

6. The method of claim 4, wherein if a second verified channel for the assigned carrier is found, then operate on the first strongest verified channel and report two site coverage as operating until a supervision delay or a loss of signal is experienced.

7. A system for operating a control channel cellular radio transmitter for reporting a status of a fire alarm system comprising:
    means for scanning available cellular control channels and measuring the signal strength of each cellular control channel;
    means for selecting a cellular control channel with the strongest signal strength which is verified as being available for the assigned carrier to report a status of the fire alarm system;
    means for selecting a cellular control channel with a second strongest signal strength which is also verified as being available for the assigned carrier to report a status of the fire alarm system;
    means for transmitting a cellular radio message on the status of the fire alarm system over either of the cellular control channel with the strongest signal strength or the cellular control channel with the second strongest signal strength.

8. The system of claim 7, including means for developing a channel list in which the cellular control channels are sorted and classified according to signal strength.

9. The system of claim 8, including means for checking the channel list for availability of two or more channels with acceptable RSSI (Receive Signal Strength Indication), and if two or more channels with acceptable RSSI are not available, means for reporting a loss of two site coverage, and if two or more channels with acceptable RSSI are available, means for operating on the strongest verified channel until a supervision delay or a loss of signal is experienced.

10. The system of claim 9, including means for checking all available channels on the channel list for a second verified channel for the assigned channel.

11. The system of claim 10, wherein if a second verified channel for the assigned channel is not found, means for reporting a loss of two site coverage of two separate verified channels with acceptable RSSI, and means for operating on the strongest verified channel.

12. The system of claim 10, wherein if a second verified channel for the assigned carrier is found, means for operating on the first strongest verified channel and means for reporting two site coverage as operating until a supervision delay or a loss of signal is experienced.

* * * * *